United States Patent Office 3,481,923
Patented Dec. 2, 1969

3,481,923
PRODUCTION OF COPOLYMERS OF LACTAMS AND DIENES
Herbert Naarmann, Ludwigshafen (Rhine), Germany, assignor to Badische Anilin- & Soda-Fabrik Aktiengesellschaft, Ludwigshafen (Rhine), Germany
No Drawing. Filed Nov. 1, 1966, Ser. No. 591,098
Claims priority, application Germany, Nov. 27, 1965, 1,570,319
Int. Cl. C07d 41/06; C08g 20/10, 20/12
U.S. Cl. 260—239.3              6 Claims

ABSTRACT OF THE DISCLOSURE

The present invention relates to a process for the production of copolymers of lactams and dienes which comprises copolymerizing a 1,3-diene with a lactam.

---

It is known that lactams, e.g. caprolactam and pyrrolidone, can be polymerized using alkaline catalysts. This method is known as anionic lactam polymerization. Alkali metals, alkali metal hydroxides, alkali metal alcoholates and particularly alkali metal lactamates are used as catalysts for this purpose. Comparatively high molecular weight polylactams, distinguished for example by great hardness and abrasion resistance, are obtained by this method in an exothermic reaction which proceeds very rapidly.

On the other hand it is known that 1,3-dienes, e.g. butadiene and isoprene, can be polymerized using catalytic amounts of alkali metals, particularly sodium. The addition of a small amount of monomeric or polymeric amides, e.g. caprolactam, polycaprolactam and polyhexamethylene adipamide, in the said known method of preparing 1,3-diene polymers, however, causes termination of the polymerization.

We have now found that copolymers of lactams and dienes can be prepared by a process which comprises copolymerizing a 1,3-diene with a lactam using a catalytic amount of a metal of main group I or II of the Periodic System of the Elements.

In view of the fact that lactams terminate the reaction in alkali metal catalyzed 1,3-diene polymerization, this is highly surprising.

In the process of the present invention those lactams are preferred which have four to twelve ring carbon atoms. Examples are pyrrolidone, caprolactam, capryllactam, oenantholactam and laurolactam and mixtures of such lactams.

Butadiene and isoprene are preferred as 1,3-dienes for the new process. Examples of other suitable 1,3-dienes are: chloroprene, 2,3-dichlorobutadiene, 2-phenylbutadiene, 2,3-diphenylbutadiene, 2-ethoxybutadiene and 2,3-diethoxybutadiene. Mixtures of 1,3-dienes are also suitable.

The ratio of the amount of lactam to that of 1,3-diene may be varied within wide limits in the new process. It depends on the metal of main group I or II of the Periodic System of the Elements.

Metals of main groups I and II of the Periodic System of the Elements which are particularly suitable for the purposes of the present invention are lithium, sodium, potassium, magnesium and calcium. When lithium or magnesium is used, lactam-diene copolymers are obtained which contain more than 50 1,3-diene units per molecule. If on the other hand sodium, potassium or calcium be used as catalyst, copolymers are obtained which contain only up to about 20 1,3-diene units per molecule. Accordingly lithium and/or magnesium is used as the catalyst when copolymers having a relatively high proportion of 1,3-diene units are required; in this case a molar ratio of 1,3-diene to lactam in the reaction mixture of 1:0.001 to 1:0.0001 is chosen. If on the other hand copolymers are to be prepared containing a relatively small proportion of 1,3-diene units, sodium, potassium and/or calcium is used as the catalyst; in this case a molar ratio of 1,3-diene to lactam in the reaction mixture of 1:1 to 0.01:1 is chosen.

The amount of metal used as catalyst may be varied within wide limits. In general the amount of the metals used is 0.001 to 5% by weight on the total amount of monomers.

Solvents which are inert to the catalysts may be used in the process. Examples of solvents are: aliphatic, cycloaliphatic and aromatic hydrocarbon and/or ethers. Specific examples of suitable solvents are: cyclohexane, n-octane, benzene, toluene, diethyl ether, dibutyl ether and tetrahydrofuran.

The pressure used is not critical for the new process and may be varied within wide limits. In general the vapor pressure of the monomers may be used. The temperature may also be varied within wide limits in the process. Temperatures of from $-20°$ to $+200°$ C. are used in general and the temperature range of from $0°$ to $100°$ C. is preferred as the reaction temperature. Water and oxygen should in general be excluded as far as possible.

According to the new process copolymers of lactams and dienes can be prepared which are highly viscous oils or tough solids having high elasticity. The Shore hardness A of high molecular weight solids is usually from about 80 to about 500. The low sensitivity of the products to oxidation and heat is one of their particular advantages. Products containing at least 50% by weight of diene units furthermore exhibit a low temperature behavior which is practically determined only by the content of diene units. The content of polyamide units results in a higher modulus in shear at room temperature.

The new copolymers may be used as raw materials for paints and lacquers and as impact resistant molding materials. As impact resistant molding materials the high molecular weight products are suitable for example for the production of casings, containers and household articles. The oily copolymers are particularly suitable as raw materials for the production of lacquers, for improving the viscosity of oils, as additives to mixtures of rubber and polyamides and as additives to other plastics, e.g. polyethylene, polypropylene and rubbers.

The invention is further illustrated by the following examples in which the parts and percentages specified are by weight.

EXAMPLE 1

2 parts of sodium is introduced into 100 parts of purified and dried pyrrolidone and brought into solution by heating in vacuo. The solution is heated at 115° C. under subatmospheric pressure (10 mm. Hg) for two and a half hours and cooled to about 25° C. Under pure nitrogen at atmospheric pressure, 200 parts of dry butadiene is added followed by 1 part of adipoyldipyrrolidone with vigorous stirring. Polymerization is then carried on for twenty-five hours at 20° C., the temperature then being held for five hours at 85° C. Finally the reaction mixture is extracted successively with cyclohexane and methanol. 108 parts of a copolymer of pyrrolidone and butadiene is obtained having a K value of 21 (measured in 0.1% solution in dimethyl formamide), whose content of butadiene units is 12% by weight.

EXAMPLE 2

(a) The procedure of Example 1 is followed but caprolactam is used instead of pyrrolidone. 112 parts of a copolymer of caprolactam and butadiene is obtained having a K value of 23.5 (measured in 0.1% solution in dimethyl formamide) whose content of butadiene units is 18% by weight. The content of diene units exhibits the following steric configuration: 82% of vinyl groups, 11% having 1,4-trans structure and 7% having 1,4-cis structure.

(b) The procedure under (a) is followed but using potassium instead of sodium. 109 parts of a copolymer is obtained having a K value of 18.2 (measured in 0.1% solution in toluene).

(c) The procedure under (a) is followed but using magnesium instead of sodium. 122.5 parts of a copolymer having the K value 242 (measured in 0.1% solution in dimethyl formamide) is obtained.

EXAMPLE 3

(a) The procedure of Example 1 is followed but lithium is used instead of sodium. 114 parts of a copolymer of pyrrolidone and butadiene is obtained having a K value of 42.3 (measured in 0.1% solution in dimethyl formamide) whose content of butadiene units is 21% by weight.

(b) The procedure under (a) is followed but using 20 parts of lithium. 270 parts of a copolymer of pyrrolidone and butadiene is obtained which has a K value of 87 (measured in 0.1% solution in a mixture of equal parts of dimethyl formamide and xylene) and a content of butadiene units of about 66% by weight.

EXAMPLE 4

The procedure of Example 3(b) is followed but 1000 parts of isoprene is used instead of butadiene. 734 parts of a copolymer of pyrrolidone and isoprene is obtained which has a K value of 89.5 (measured in 0.1% solution in a mixture of equal parts of dimethyl formamide and dichlorobenzene) and a content of isoprene units of about 88% by weight.

I claim:
1. A process for the production of copolymers of a 1,3-diene selected from the group consisting of butadiene, isoprene, chloroprene, 2,3-dichlorobutadiene, 2-phenylbutadiene, 2,3-diphenylbutadiene, 2-ethoxybutadiene, 2,3-diethoxybutadiene, and mixtures thereof, and a lactam having 4 to 12 ring carbon atoms which comprises: copolymerizing said diene and said lactam at a temperature of from −20° C. to +200° C. in the presence of from 0.001 to 5% by weight with reference to the monomers of a metal of main group I or II of the Periodic System of the Elements, the molar ratio of diene to lactam being from 1:0.001 to 0.01:1.

2. A process as claimed in claim 1 wherein the lactam is pyrrolidone, caprolactam, capryllactam, oenantholactam, laurolactam or a mixture of such lactams.

3. A process as claimed in claim 1 wherein the 1,3-diene is butadiene or isoprene.

4. A process as claimed in claim 1 wherein the metal of main group I or II of the Periodic System of the Elements is lithium, sodium, potassium, magnesium or calcium.

5. A process as in claim 1 wherein said metal is selected from the group consisting of sodium, potassium, and calcium.

6. A process as in claim 1 wherein said metal is selected from the group consisting of lithium and magnesium.

References Cited

UNITED STATES PATENTS 3,294,754   12/1966   Naarmann et al. _____ 260—78

R. T. BOND, Primary Examiner

U.S. Cl. X.R.

52—309; 137—92; 260—3, 5, 15, 17, 78, 294.7, 326.5, 857, 879, 883